US009566768B2

United States Patent
Ibe et al.

(10) Patent No.: US 9,566,768 B2
(45) Date of Patent: Feb. 14, 2017

(54) THERMALLY SHRINKABLE LAMINATE FILM FOR DEEP DRAWING, PACKAGED ARTICLE, AND METHOD FOR PACKAGING OF CHEESE

(75) Inventors: Seiichi Ibe, Ibaraki (JP); Tadayoshi Itoh, Ibaraki (JP); Hitoshi Ishii, Ibaraki (JP)

(73) Assignee: KUREHA CORPORATION, Tokyo (JP)

( * ) Notice: Subject to any disclaimer, the term of this patent is extended or adjusted under 35 U.S.C. 154(b) by 485 days.

(21) Appl. No.: 12/808,475

(22) PCT Filed: Nov. 17, 2008

(86) PCT No.: PCT/JP2008/070868
§ 371 (c)(1),
(2), (4) Date: Jun. 16, 2010

(87) PCT Pub. No.: WO2009/078240
PCT Pub. Date: Jun. 25, 2009

(65) Prior Publication Data
US 2011/0129576 A1    Jun. 2, 2011

(30) Foreign Application Priority Data

Dec. 17, 2007 (JP) ................................. 2007-324754

(51) Int. Cl.
*B32B 27/08* (2006.01)
*B32B 27/32* (2006.01)
(Continued)

(52) U.S. Cl.
CPC .............. *B32B 27/08* (2013.01); *B32B 27/32* (2013.01); *B32B 27/34* (2013.01); *C08G 69/40* (2013.01);
(Continued)

(58) Field of Classification Search
CPC .............................. B65D 85/76; B65D 75/305
(Continued)

(56) References Cited

U.S. PATENT DOCUMENTS 3,946,089 A * 3/1976 Furukawa et al. ............ 525/408
4,486,507 A * 12/1984 Schumacher .............. 428/476.1
(Continued)

FOREIGN PATENT DOCUMENTS

EP    1 097 810 A2    5/2001
JP    03-284332    12/1991
(Continued)

OTHER PUBLICATIONS http://www.arkema-inc.com/literature/pdf/100.pdf which was archived on the Internet Archive on Mar. 21, 2006 at http://web.archive.org/web/20060321052054/http://www.arkema-inc.com/literature/pdf/100.pdf.*
(Continued)

*Primary Examiner* — Ellen S Wood
(74) *Attorney, Agent, or Firm* — Sughrue Mion, PLLC

(57) ABSTRACT

The invention has for its object to provide a heat-shrinkable laminated film for deep drawing, which has an increased carbon dioxide transmission rate ($CO_2TR$) and an enhanced ratio ($CO_2TR/O_2TR$) of carbon dioxide transmission rate-to-oxygen transmission rate ($O_2TR$), and is less susceptible to pinholes. In the inventive heat-shrinkable laminated film for deep drawing, a polyamide resin composition layer (a) containing a polyamide resin mixture comprising 60 to 95% by mass of an aliphatic polyamide resin (A) and 5 to 40% by mass of a polyamide base resin (B) having a heat of crystalline fusion of 5 to 40 J/g is laminated onto a heat-sealing resin layer (a) containing a polyolefin resin via an adhesive resin layer (b).

7 Claims, 3 Drawing Sheets

(51) Int. Cl.
*B32B 27/34* (2006.01)
*C08G 69/40* (2006.01)
*C08L 77/00* (2006.01)
*C08L 77/06* (2006.01)
*B65D 75/00* (2006.01)
*B65D 85/76* (2006.01)
*B29K 77/00* (2006.01)
*B29C 51/00* (2006.01)

(52) U.S. Cl.
CPC .............. *C08L 77/00* (2013.01); *C08L 77/06* (2013.01); *B29C 51/002* (2013.01); *B29K 2077/00* (2013.01); *B32B 2307/724* (2013.01); *B32B 2439/70* (2013.01); *B65D 75/002* (2013.01); *B65D 85/76* (2013.01); *C08L 2205/02* (2013.01); *Y10T 428/1328* (2015.01); *Y10T 428/264* (2015.01); *Y10T 428/31725* (2015.04); *Y10T 428/31736* (2015.04)

(58) Field of Classification Search
USPC ................................ 428/34.9, 474.4, 475 C
See application file for complete search history.

(56) References Cited

U.S. PATENT DOCUMENTS

| | | | |
|---|---|---|---|
| 4,803,102 A * | 2/1989 | Raniere et al. | 428/35.2 |
| 4,963,426 A * | 10/1990 | Nishimoto et al. | 428/213 |
| 5,336,549 A * | 8/1994 | Nishimoto et al. | 428/213 |
| 5,344,679 A * | 9/1994 | Vicik | 428/36.91 |
| 5,439,745 A * | 8/1995 | Ohba et al. | 428/412 |
| 5,480,945 A * | 1/1996 | Vicik | 525/432 |
| 5,763,095 A * | 6/1998 | Ramesh et al. | 428/474.4 |
| 5,840,807 A | 11/1998 | Frey et al. | |
| 6,261,698 B1 * | 7/2001 | Broda | 428/474.4 |
| 6,316,067 B1 * | 11/2001 | Edwards et al. | 428/34.9 |
| 6,416,832 B1 * | 7/2002 | Uehara et al. | 428/34.8 |
| 6,511,688 B2 * | 1/2003 | Edwards et al. | 426/130 |
| 6,565,985 B2 * | 5/2003 | Ueyama et al. | 428/474.4 |
| 6,699,549 B1 * | 3/2004 | Ueyama et al. | 428/36.7 |
| 6,746,762 B1 * | 6/2004 | Hosoda et al. | 428/332 |
| 6,815,057 B2 * | 11/2004 | Hodson et al. | 428/349 |
| 7,993,713 B2 * | 8/2011 | Ishii et al. | 428/34.9 |
| 8,012,552 B2 * | 9/2011 | Johansson | 428/34.8 |
| 2003/0157350 A1 | 8/2003 | Ueyama et al. | |
| 2006/0110554 A1 * | 5/2006 | Bernig et al. | 428/35.2 |
| 2007/0026113 A1 * | 2/2007 | Fanfani et al. | 426/127 |
| 2007/0031546 A1 * | 2/2007 | Nelson et al. | 426/106 |

FOREIGN PATENT DOCUMENTS

| | | |
|---|---|---|
| JP | 4-59244 A | 2/1992 |
| JP | 08-283432 | 10/1996 |
| JP | 2941213 | 12/1996 |
| JP | 09-132708 | 5/1997 |
| JP | 2000-327873 | 11/2000 |
| JP | 2003-211605 A | 7/2003 |
| JP | 2003-535733 | 12/2003 |
| JP | 2004-051854 | 2/2004 |
| WO | 2006-022266 | 3/2006 |

OTHER PUBLICATIONS

International Search Report for International Application No. PCT/JP2008/070868, Feb. 24, 2009.
European Search Report dated Oct. 18, 2013, issued in application No. 08861888.9-1308.

* cited by examiner

THERMALLY SHRINKABLE LAMINATE FILM FOR DEEP DRAWING, PACKAGED ARTICLE, AND METHOD FOR PACKAGING OF CHEESE

TECHNICAL FIELD

The present invention relates to a heat-shrinkable laminated film for deep drawing which has an increased carbon dioxide transmission rate ($CO_2TR$) and an enhanced ratio ($CO_2TR/O_2TR$) of carbon dioxide transmission rate ($CO_2TR$) to oxygen transmission rate ($O_2TR$), and is less susceptible of pinholes, and a package wherein the matter to be packed is packed up in that heat-shrinkable laminated film for deep drawing, and a method of packing cheese up in that heat-shrinkable laminated film for deep drawing.

For wrapping or packing foodstuffs that emit carbon dioxide while they are packed up, there is a film needed for selective transmission of carbon dioxide ($CO_2TR/O_2TR$). Patent Publication 1 discloses a shrinkable laminated film that comprises a polyamide resin layer, an adhesive resin layer and a heat-sealing resin layer and has a hot water shrinkability at 90° C. of 2 to 15% in machine and transverse directions and a carbon dioxide transmission rate of at least 30 ml/m$^2$·day·atm at 30° C. and an 80% relative humidity. That shrinkable laminated film has a high oxygen transmission rate, and with cheese packed up in it, the cheese often grew moldy. There is another carbon dioxide transmitting laminated film disclosed in Patent Publication 2, which includes a layer composed of a mixture of basic amino acid and polyalcohol and has a carbon dioxide transmission rate-to-oxygen transmission rate of 15 or greater. That laminated film could not be subjected to deep drawing. Further, Patent Publication 3 discloses a garlic packing film that includes a film composed of a composition of (A) a polyvinyl alcohol resin having a saponification degree of 60 to 95 mol % and (B) an alkylene glycol or its polymer, and has an oxygen transmission rate of 400 to 2,000 ml/m$^2$·day·atm, a carbon dioxide transmission rate of at least 7,000 ml/m$^2$·day·atm and a carbon dioxide transmission rate-to-oxygen transmission rate of at least 7. That garlic packing film had a high oxygen transmission rate, and with cheese packed up in it, the cheese often grew moldy. In addition, that garlic packing film had a decreased puncture strength, often resulting in pinholes.

Patent Publication 1: WO 2006/022266 A1
Patent Publication 2: JP 2000-327873 A
Patent Publication 3: JP 2941213 B2

DISCLOSURE OF THE INVENTION

Object of the Invention

One object of the invention is to provide a heat-shrinkable laminated film for deep drawing that has an increased carbon dioxide transmission rate ($CO_2TR$) and an enhanced ratio ($CO_2TR/O_2TR$) of carbon dioxide transmission rate to oxygen transmission rate ($O_2TR$), and is less susceptible of pinholes. Another object of the invention is to provide a package wherein the matter to be packed is packed up in that heat-shrinkable laminated film for deep drawing. Yet another object of the invention is to provide a method of packing cheese up in that heat-shrinkable laminated film for deep drawing.

Means for Achieving the Objects

According to the invention, there is a heat-shrinkable laminated film for deep drawing provided wherein a polyamide resin composition layer (a) containing a mixture of 60 to 95% by mass of an aliphatic polyamide resin (A) and 5 to 40% by mass of a polyamide base resin (B) having a heat of crystalline fusion of 5 to 40 J/g is laminated onto a heat-sealing resin layer (c) including a polyolefin resin via an adhesive resin layer (b).

In a preferable embodiment of the invention, the aforesaid polyamide base resin (B) should have a density of 0.95 to 1.10 g/cm$^3$.

In another preferred embodiment of the invention, the aforesaid polyamide base resin (B) should be a polyamide/polyether block copolymer.

In yet another preferred embodiment of the invention, the aforesaid heat-shrinkable laminated film for deep drawing should have a heat shrinkage of 3 to 35% at 90° C. in its machine and transverse directions, an oxygen transmission rate of up to 300 ml/m$^2$·day·atm, a carbon dioxide transmission rate of greater than 500 ml/m$^2$·day·atm at 23° C. and an 80% relative humidity, and a carbon dioxide transmission rate-to-oxygen transmission rate of greater than 6.

In a further preferred embodiment of the invention, the aforesaid heat-shrinkable laminated film for deep drawing should have a carbon dioxide transmission rate of greater than 800 ml/m$^2$·day·atm at 23° C. and an 80% relative, humidity, and a carbon dioxide transmission rate-to-oxygen transmission rate of greater than 7.

In a further preferred embodiment of the invention, the aforesaid polyamide resin composition layer (a) should have a thickness to 5 to 50 μm.

In a further preferred embodiment of the invention, a polyester base resin layer (d) is laminated onto the aforesaid polyamide resin composition layer (a).

The present invention also provides a package wherein the matter to be packed is packed up in a top film and a bottom film, each obtained by deep drawing of the aforesaid heat-shrinkable laminated film for deep drawing.

In a preferred embodiment of the invention, the aforesaid matter to be packed is cheese.

Further, the present invention provides a method of packing up cheese wherein cheese is packed up in a deep drawn portion of top and bottom films, each obtained by deep drawing of the aforesaid heat-shrinkable laminated film for deep drawing, then de-aeration sealing is implemented, and finally said top and bottom films are heat shrunk.

Advantages of the Invention

The inventive heat-shrinkable laminated film for deep drawing is much more increased in terms of the carbon dioxide transmission rate ($CO_2TR$) and the carbon dioxide transmission rate-to-oxygen transmission rate ($CO_2TR/O_2TR$). Therefore, as the matter to be packed such as cheese which emits out carbon dioxide while it is packed up is packed up in the top and bottom films, each obtained by deep drawing of the heat-shrinkable laminated film for deep drawing, the package is prevented from swelling due to carbon dioxide so that its outer appearance is kept attractive, and the package is prevented from deterioration by oxygen over an extended period.

The inventive heat-shrinkable laminated film for deep drawing is less susceptible of pinholes. Therefore, the matter packed according to the invention is prevented from deterioration due to pin holes.

Further, the inventive heat-shrinkable laminated film for deep drawing is prevented from wrinkling upon deep drawing and collapsing at its corners after deep drawing.

EXPLANATION OF THE REFERENCE NUMERALS

Figure 1:
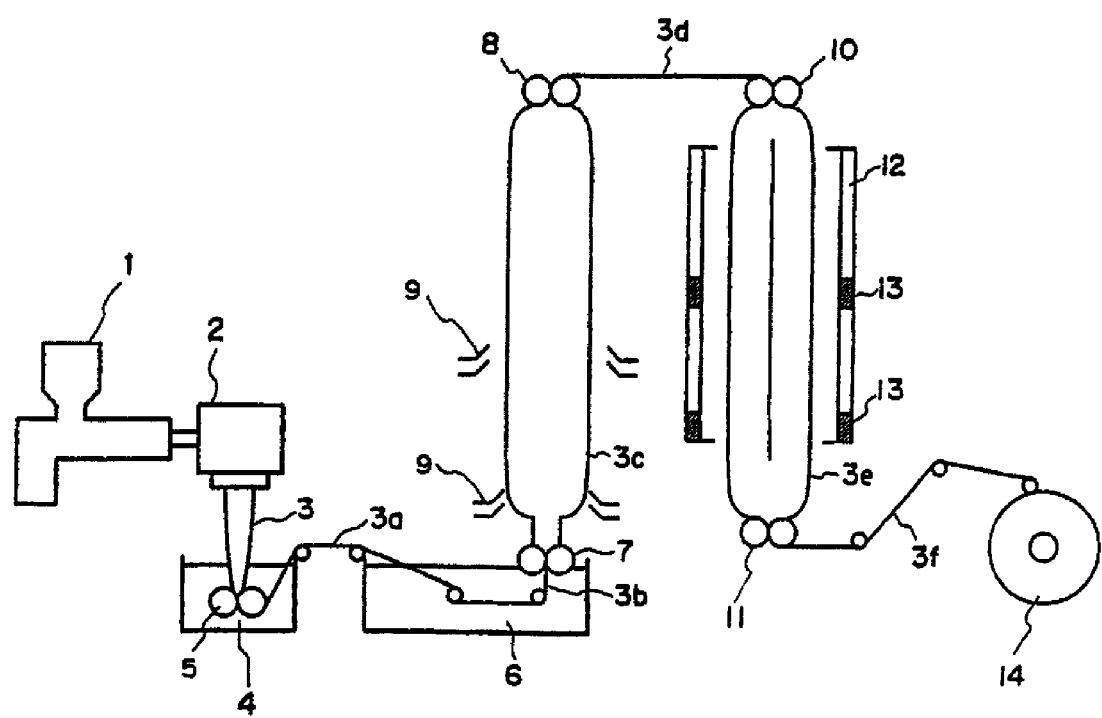
FIG. 1 is schematically illustrative of the apparatus of making the heat-shrinkable laminated film for deep drawing.

1: Extruder
2: Annular Die
3: Parison
4: Water Bath
5: Pinch Roller
6: Hot Water Bath
7: Pinch Roller
8: Pinch Roller
9: Cold Air Ring
10: Pinch Roller
11: Pinch Roller
12: Heat-treating Tube
13: Steam Blow Port
14: Take-Up Roll
21: Drive motor
22: Timing Belt
23: Package

BEST MODE FOR CARRYING OUT THE INVENTION

Some embodiments of the invention are now explained.

In the inventive heat-shrinkable laminated film for deep drawing, the polyamide resin composition layer (a) contains a mixture of the aliphatic polyamide resin (A) and the polyamide resin comprising a polyamide base resin (B) having a heat of crystalline fusion of 5 to 40 J/g.

Specific examples of the aliphatic polyamide resin (A) are nylon 6, nylon 66, nylon 69, nylon 610, nylon 612, nylon 11, nylon 12, nylon 6-66 (that is a nylon 6/nylon 66 copolymer: the same terminology shall apply hereinafter), nylon 6-10, nylon 6-12, nylon 6-69, nylon 6-610, and nylon 66-69, among which nylon 66, and nylon 6-12 is preferred in view of processability on molding. These aliphatic polyamide resins may be used alone or in admixture of two or more.

The proportion of the aliphatic polyamide resin (A) mixed with the mixture of polyamide resins is 60 to 95% by mass, preferably 65 to 95% by mass, and more preferably 70 to 95% by mass. As that mixing proportion is less than 60% by mass, it causes the oxygen transmission rate of the heat-shrinkable laminated film for deep drawing to grow too high, rendering bubbles on film formation by drawing instable. As that mixing proportion is greater than 95% by mass, it causes the ratio ($CO_2TR/O_2TR$) of carbon dioxide transmission rate ($CO_2TR$)-to-oxygen transmission rate ($O_2TR$) of the heat-shrinkable laminated film for deep drawing to become too low, resulting in expansion of a package of cheese packed up in that heat-shrinkable laminated film for deep drawing.

The heat of crystalline fusion ($\Delta HB$) of the polyamide base resin (B) is 5 to 40 J/g, preferably 5 to 35 J/g, and more preferably 5 to 30 J/g. Specific examples of the polyamide base resin (B) are Pebax MV1074 made by Arkema Co., Ltd. (polyamide/polyether block copolymer; $\Delta HB=30$ J/g), Amilan CM6241F made by Toray Industries, Ltd. (nylon 6-66; $\Delta HB=36$ J/g), Grilon CR-8 made by EMS Chemie Japan Ltd. (nylon 6-12; $\Delta HB=32$ J/g), and Grilon CR-9 made by EMS Chemie Japan Ltd. (nylon 6-12; $\Delta HB=38$ J/g), among which the polyamide/polyether block copolymer is preferred. The polyamide/polyether block copolymer improves the ratio ($CO_2TR/O_2TR$) of carbon dioxide transmission rate ($CO_2TR$)-to-oxygen transmission rate ($O_2TR$) in small quantities, doing no damage to the film formation capability of the laminated film.

As the heat of crystalline fusion of the polyamide base resin (B) contained in the mixture of polyamide resins is less than 5 J/g, it causes the heat-shrinkable laminated film for deep drawing to have a carbon dioxide transmission rate of less than 500 ml/$m^2$·day·atm at 23° C. and an 80% relative humidity, rendering it impossible to use that heat-shrinkable laminated film for deep drawing as a film for packing up cheese. As that heat of crystalline fusion is greater than 40 J/g, it causes the ratio ($CO_2TR/O_2TR$) of carbon dioxide transmission rate ($CO_2TR$)-to-oxygen transmission rate ($O_2TR$) to become low, often ending up with expansion of a package of cheese packed up in that heat-shrinkable laminated film for deep drawing.

The heat of crystalline fusion $\Delta HA$ of the aliphatic polyamide (A) and the heat of crystalline fusion $\Delta HB$ of the polyamide base resin (B) used here satisfy the following condition (1):

$$\Delta HA > \Delta HB \qquad (1)$$

The polyamide base resin (B) has preferably a density of 0.95 to 1.10 g/$cm^3$. As the density of the polyamide base resin (B) is less than 0.95 g/$cm^3$, it causes the polyamide base resin (B) to go worse in terms of processability on extrusion. As the density of the polyamide base resin (B) is greater than 1.10 g/$m^3$, it causes the ratio ($CO_2TR/O_2TR$) of carbon dioxide transmission rate ($CO_2TR$)-to-oxygen transmission rate ($O_2TR$) to become low, often ending up with expansion of a package of cheese packed up in the heat-shrinkable laminated film for deep drawing.

Specific examples of the adhesive resin contained in the adhesive resin layer (b) of the inventive heat-shrinkable laminated film for deep drawing are an ethylene-ethyl acrylate copolymer (EEA), an ethylene-acrylic acid copolymer (EAA), an ethylene-methacrylic acid copolymer (EMAA), an ionomer and an acid-modified polyolefin, among which preference is given to the polyolefin modified by an acid such as maleic or fumaric acid or its acid anhydride. The aforesaid adhesive resins may be used alone or in admixture of two or more.

With none of the adhesive resin layer (b) interposed between the polyamide resin composition layer (a) and the heat-sealing resin layer (c) containing the polyolefin resin, there would be the likelihood of the polyamide resin composition layer (a) peeling off the heat-sealing resin layer (c) containing the polyolefin resin.

Specific examples of the polyolefin resin contained in the heat-sealing resin layer (c) of the inventive heat-shrinkable laminated film for deep drawing are polypropylene, a propylene-ethylene copolymer, a linear, very-low-density polyethylene, a linear, low-density polyethylene (the catalyst used for producing four such polyolefin resins may be any of the Ziegler-Natta catalyst, the metallocene type catalyst, the constrain geometric catalyst made by Dow Chemical Co., and the phenoxyimine complex type catalyst), a low-density polyethylene polymerized by the high pressure process, an ethylene-vinyl acetate copolymer, an ionomer, an ethylene-(meth)acrylic acid copolymer, an ethylene-(meth) acrylic acid-unsaturated carboxylic acid (ester) copolymer, and an ethylene-(meth)acrylic acid ethyl copolymer. These polyolefin resins may be used alone or in admixture of two or more.

Preferably, the melting point of the polyolefin resin is lower than that of the polyamide resin composition layer (a). As the melting point of the polyolefin resin is higher than that of the polyamide resin composition layer (a), it causes the polyamide resin composition layer (a) to melt out upon heat sealing of the heat-shrinkable laminated film for deep drawing. The polyolefin resin should have a melting point of preferably not higher than 150° C., and more preferably 90 to 135° C.

The polyester base resin layer (d) may be laminated onto the surface of the polyamide resin composition layer (a) opposite to the surface thereof onto which the heat-sealing resin layer (c) via an adhesive resin layer (b). The aforesaid adhesive resin layer (b) may be interposed between the polyamide resin composition layer (a) and the polyester base resin layer (d).

Specific examples of the dicarboxylic acid component of the polyester base resin contained in the polyester base resin layer (d) are terephthalic acid, isophthalic acid, and a dimer of an unsaturated fatty acid. The di-carboxylic acid components may be used alone or in admixture of two or more. Specific examples of the diol component of the aforesaid polyester base resin are ethylene glycol, propylene glycol, tetramethylene glycol, neopentyl glycol, hexamethylene glycol, diethylene glycol, polyethylene glycol, polytetramethylene oxide glycol, 1,4-cyclohexanedimethanol, 2-alkyl-1,3-propanediol. The diol components may be used alone or in admixture of two or more.

The preferable polyester base resin is polyethylene terephthalate, polybutylene terephthalate, an polyester copolymer in which a part of the terephthalic acid component of these aromatic polyester resins is substituted by isophthalic acid, and a polyester copolymer in which the ethylene glycol or tetramethylene glycol component of these aromatic polyester resins is substituted by 1,4-cyclohexanedimethanol or polyalkylene glycol.

The polyester base resins may be used alone or in admixture of two or more.

Lubricants and/or antistatic agents may be added to the polyamide resin composition layer (a), the heat-sealing resin layer (c) and/or the polyester base resin layer (d). The lubricants may be in a liquid or solid state.

Exemplary lubricants are hydrocarbon base ones such as liquid paraffin, natural paraffin, polyethylene wax, and microcrystalline wax; fatty acid base ones such as stearic acid, and lauric acid; aliphatic amide base ones such as stearic acid amide, palmitic acid amide, N-oleylpalmitic acid amide, behenic acid amide, erucic acid amide, arachidic acid amide, oleic acid amide, methylenebisstearoamide, and ethylenebisstearoamide; ester base ones such as butyl stearate, hardened castor oil, ethylene glycol monostearate, and stearic acid monoglyceride; metal soaps derived from fatty acids having 12 to 30 carbon atoms such as zinc stearate, and calcium stearate; and inorganic ones such as silica, and zeolite. These lubricants may be used alone or in admixture of two or more. The preferable lubricants are fatty acid amides, and metal soaps. The lubricant may be added in a master batch form. The amount of the master batch added, in which 5 to 20% by mass of the lubricant are contained, is 0.1 to 10% by mass relative to the resin layer.

Exemplary antistatic agents are anionic surfactants, cationic surfactants, nonionic surfactants, and amphoteric surfactants, and they may be used alone or in admixture of two or more. The amount of the antistatic agents added is 0.05 to 2% by mass, preferably 0.1 to 1% by mass relative to the resin layers.

The inventive heat-shrinkable laminated film for deep drawing has a heat shrinkage of preferably 3 to 35% at 90° C. in the machine and transverse directions. As that heat shrinkage is less than 3%, it renders a packing material obtained by deep drawing of the heat-shrinkable laminated film for deep drawing susceptible to wrinkle. As that heat shrinkage is greater than 35%, it may render it difficult to deep draw the heat-shrinkable laminated film for deep drawing, or it may cause breaks in the sealed portions of a packing material obtained by deep drawing of the heat-shrinkable laminated film for deep drawing.

The inventive heat-shrinkable laminated film for deep drawing has an oxygen transmission rate at 23° C. and an 80% relative humidity of preferably not greater than 300 ml/m$^2$·day·atm, and more preferably not greater than 250 ml/m$^2$·day·atm. As that oxygen transmission rate is greater than 300 ml/m$^2$·day·atm, it causes oxygen to come in contact with cheese packed up in the heat-shrinkable laminated film for deep drawing, often resulting in mold growing over the cheese.

The inventive heat-shrinkable laminated film for deep drawing has a carbon dioxide transmission rate at 23° C. and an 80% relative humidity of preferably not lower than 500 ml/m$^2$·day·atm, and more preferably not lower than 800 ml/m$^2$·day·atm. As that carbon dioxide transmission rate is less than 500 ml/m$^2$·day·atm, it may cause the heat-shrinkable laminated film for deep drawing to expand due to carbon dioxide emitted out of the packed matter such natural cheese or kimuchi that gives out carbon dioxide or, in the worst case, blow up.

The polyamide resin composition layer (a) has a thickness of preferably 0.5 to 50 μm. As that thickness is less than 0.5 μm, it causes drawability on film formation to tend to go worse, and as that thickness is greater than 50 μm, it causes the carbon dioxide transmission rate to tend to become low.

The adhesive resin layer (b) has a thickness of preferably 0.5 to 10 μm. As that thickness is less than 0.5 μm, it renders thickness control on co-extrusion difficult, and as that thickness is greater than 10 μm, the cost involved grows high.

The heat-sealing resin layer (c) has a thickness of preferably 10 to 100 μm. As that thickness is less than 10 μm, it causes heat-sealing strength to tend to become low, and as that thickness is greater than 100 μm, no sensible balance is offered between the thickness of the heat-sealing resin layer (c) and that of other layers when the total thickness of the laminated film is considered into account.

How to produce the inventive heat-shrinkable laminated film for deep drawing is not critical. Exemplary production of that laminated film is now explained.

FIG. 1 is schematically illustrative of the apparatus adapted to produce the inventive heat-shrinkable laminated film for deep drawing. A parison 3 including the polyamide resin composition layer (a), the adhesive resin layer (b) and the heat-sealing resin layer (c) is co-extruded out of extruders 1 preset in number depending on the number of laminated resin species forming the inventive heat-shrinkable laminated film for deep drawing through an annular die 2 (only one extruder shown). While the parison 3 is cooled by the water bath 4 down to lower than the melting points of the main resins accounting for the respective layers, preferably lower than 20° C., and more preferably lower than 15° C., it is taken off by the pinch roller 5. Then, while a tearing agent represented by soy bean oil, a fatty acid ester of glycerin, and propylene glycol is enclosed in the taken-off parison 3, it is introduced in the hot water bath 6 set at lower than the melting points of the main resins accounting for the respective layers, for instance, 80 to 95° C., and a heated parison 3b is pulled up so that a tubular film 3c is formed by fluid air admitted between a pair of pinch rollers 7 and 8. Then, while the tubular film 3c is cooled by the cold air ring 9 of 10 to 20° C., it is bi-axially oriented at a stretching ratio of preferably 2.5 to 4, more preferably 2.6 to 3.5, and most preferably 2.8 to 3.5 in the machine direction (MD) and transverse direction (TD), respectively. Then, the drawn tubular film 3d is taken down so that a tubular film 3e is again formed by fluid air admitted between a pair of pinch roller 10 and 11, and held in the heat-treating tube 12. Then, steam is blown, alone or with air, onto the port 13 of the heat-treating tube 12 so that the bi-axially oriented tubular film 3e is heat treated at preferably 60 to 90° C., more preferably 65 to 85° C. for about 1 to 20 seconds, preferably about 1.5 to 10 seconds to relax it 5 to 30%, preferably 10 to 25% in the machine direction (MD) and transverse direction (TD), respectively. The thus heat-treated tubular film 3f, equivalent to the inventive heat-shrinkable laminated film for deep drawing, is taken up by the take-up roll 14. The aforesaid thermal relaxation relying up steam heat treatment may be implemented by infrared heating, too.

As the stretching ratio of the tubular film 3c in the machine direction (MD) and transverse direction (MD) is less than 2.5, it causes the heat-shrinkable laminated film for deep drawing to have low strength, giving rise to large variations in the thickness of that film. As that stretching ratio is greater than 4, there is a break in the drawn film.

As the thermal relaxation ratio of the tubular film 3e in the machine direction (MD) and transverse direction (TD) is below 5%, it causes the heat-shrinkable laminated film for deep drawing to have too large stress on shrinkage, giving rise of crushing of the corners of a package when the matter packed in it is vacuum sealed. As the thermal relaxation ratio is greater than 30%, it causes the heat-shrinkable laminated film for deep drawing to have too low a heat shrinkage, and have spots in the widthwise and thickness directions as well, doing damage to film transparency.

Before or after drawing, the aforesaid tubular film 3c may be irradiated with radiations by a well-known technique. Drawability, heat resistance and mechanical strength are improved by irradiation with radiations. The preferable radiation is electron radiation in view of film handleability, high throughput, etc.

The inventive heat-shrinkable laminated film for deep drawing is formed into top and bottom films by means of ordinary deep drawing. The drawn top film has a total thickness of preferably 30 to 90 μm, more preferably 30 to 70 μm, and even more preferably 30 to 60 μm. As that total thickness is less than 30 μm, it causes film stability on film formation to tend to go worse, and film strength to tend to go down. As that total thickness is greater than 90 μm, on the other hand, it causes a package to tend to wrinkle, and the content to tend to deform.

The drawn bottom film has a total thickness of preferably 40 to 130 μm, more preferably 40 to 120 μm, and even more preferably 40 to 100 μm. As that total thickness is less than 40 μm, it causes the deep drawn film to tend to become thin and have unsatisfied strength. As that total thickness is greater than 130 μm, on the other hand, it causes the carbon dioxide transmission rate to tend to become low.

After the matter to be packed is filled up in the deep drawn portions of the top and bottom films obtained by deep drawing of the inventive heat-shrinkable laminated film for deep drawing, de-aeration sealing is implemented, and the top and bottom films are then subjected to heat shrinkage so that the inventive package is obtained.

EXAMPLES

By way of example but not by way of limitation, the present invention is now explained with reference to inventive and comparative examples. First of all, how to estimate the properties is explained.

1. Tensile Modulus

Tensile modulus was found pursuant to the method set forth in ASTM D882-88. A laminated film sample in a rectangular form of 20 mm in width and 100 mm in length was mounted on a measuring machine (TENSILON RTC-1210 Model made by Orientec Co., Ltd.), and stretched at a crosshead speed of 10 mm/min in a 23° C. and 50% RH atmosphere to figure out film tensile modulus.

2. Shrinkage in Hot Water

The shrinkage in hot water was found pursuant to the method set forth in ASTM D2732. A laminated film sample was marked at an interval of 10 cm in the machine (longitudinal) direction and the direction vertical (transverse) to the machine direction. Then, the marked laminated film sample was immersed in hot water of 90° C. for 10 seconds, and then removed from within it, immediately after which the sample was cooled down in water of normal temperature. Thereafter, the mark-to-mark spacing was measured to figure out the heat shrinkage from the equation given below.

Heat Shrinkage(%)=[reduction (cm) from 10 cm/initial 10 cm]×100

For each of the top and bottom films, 5 tests were carried out, and the average in the machine and transverse directions was taken as the shrinkage in hot water.

3. Puncture Strength

A laminated film sample was set on a tensile testing machine (TENSILON®-100 made by Orientec Co., Ltd.) equipped with a stabbing pin having a hemispheric end of 0.5 mm in the radius of curvature, and that stabbing pin was stabbed into the laminated film sample from outside (the first layer side) at a rate of 20 m/min, 23° C. and a 50% RH. The puncture strength here was defined as the maximum stress value (N) by the time the laminated film sample broke down.

4. Carbon Dioxide Transmission Rate

The carbon dioxide transmission rate of a laminated film sample was measured pursuant to the method set forth in ASTM D1434-82 in an atmosphere of 23° C. and an 80% RH, using a carbon dioxide transmission rate meter (OX-TRAN2/20 made by Modern Control Co., Ltd.).

5. Oxygen Transmission Rate

The oxygen transmission rate of a laminated film sample was measured pursuant to the method set forth in ASTM D3985 in an atmosphere of 40° C. and an 90% RH, using an oxygen transmission rate meter (OX-TRAN2/20 made by Modern Control Co., Ltd.).

6. Water Vapor Transmission Rate

The water vapor transmission rate of a laminated film sample was measured pursuant to the method set forth in ASTM F1249-90 in an atmosphere of 23° C. and an 80% RH, using a water vapor transmission rate meter (PERMA-RAN-W3/31 made by Modern Control Co., Ltd.).

7. Haze Value

The haze value of a laminated film sample was measured pursuant to the method set forth in JIS K-7105, using a haze meter (NDH-Σ80 made by Nippon Denshoku Industries Co., Ltd.).

8. Carbon Dioxide Selection Ratio

The carbon dioxide selection ratio was figured out from the following equation.

Carbon Dioxide Selection Ratio=Carbon Dioxide Transmission Rate/Oxygen Transmission Rate 9. Heat of Crystalline Fusion The heat of crystalline fusion was measured pursuant to the method set forth in ISO11357-5, using a differential scanning calorimeter (DSC7 made by Perkin Elmer Co., Ltd.).

10. Estimation of Expansion of Gas in Package

A laminated film sample was deep drawn in a mold of 130 mm in length, 185 mm in width and 75 mm in depth in a deep drawing machine (R-550 made by MULTIVAC Co., Ltd.) while it was heated at 110° C. for 1.5 seconds, thereby obtaining a top film and a bottom film. Then, 1.5 kg of a kind of natural cheese or Edam cheese were packed up in the deep drawn portions of the top and bottom films, and vacuum packing was carried out at a sealing temperature of 140° C., after which heat shrinkage was implemented by a shrinker at 90° C. for 1 second, yielding a package. The package was let stand alone at 15 to 16° C. and a 90% RH for 5 weeks for cheese aging. The surface state of the laminated film by gas expansion of the package was visually estimated according to the following criteria.

A: The package was well kept in appearance (the package maintained a vacuum inside).
B: Some gas remained between cheese and the laminated film.
C: The package was significantly expanded.

11. Estimation of Wrinkling of the Package

The aforesaid package was stored at 15 to 16° C. and a 90% RH for 130 days, after which its appearance was visually determined by the following criteria.

A: The package was well kept in appearance (the package maintained a vacuum inside).
B: There were a few wrinkles at the body of the package.
C: Numerous wrinkles occurred on the package, doing damage to the appearance of the package.

12. Abuse Strength

Figure 2:
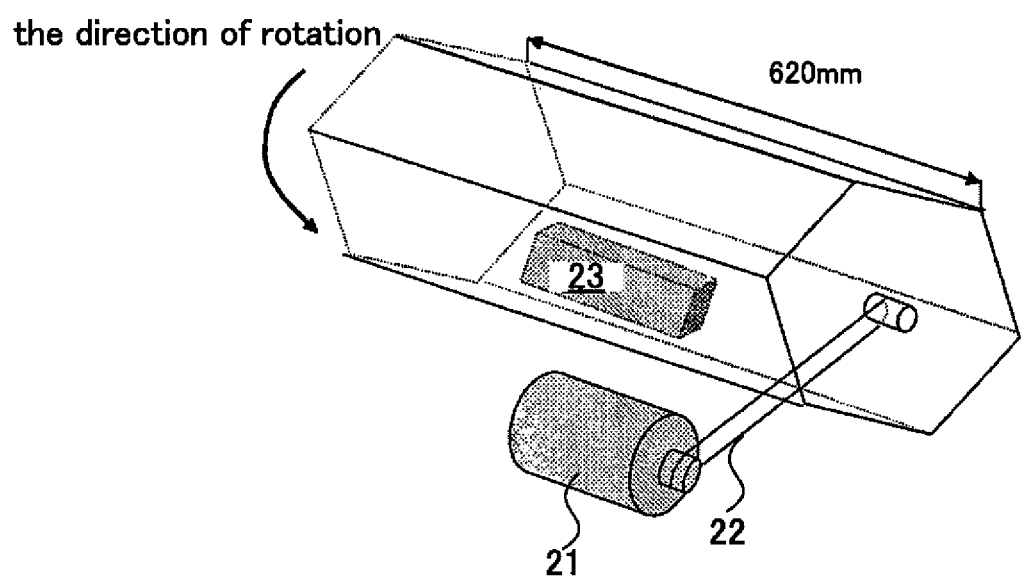
FIG. 2 is schematically illustrative of a hexagonal rotary testing machine.
Figure 3:
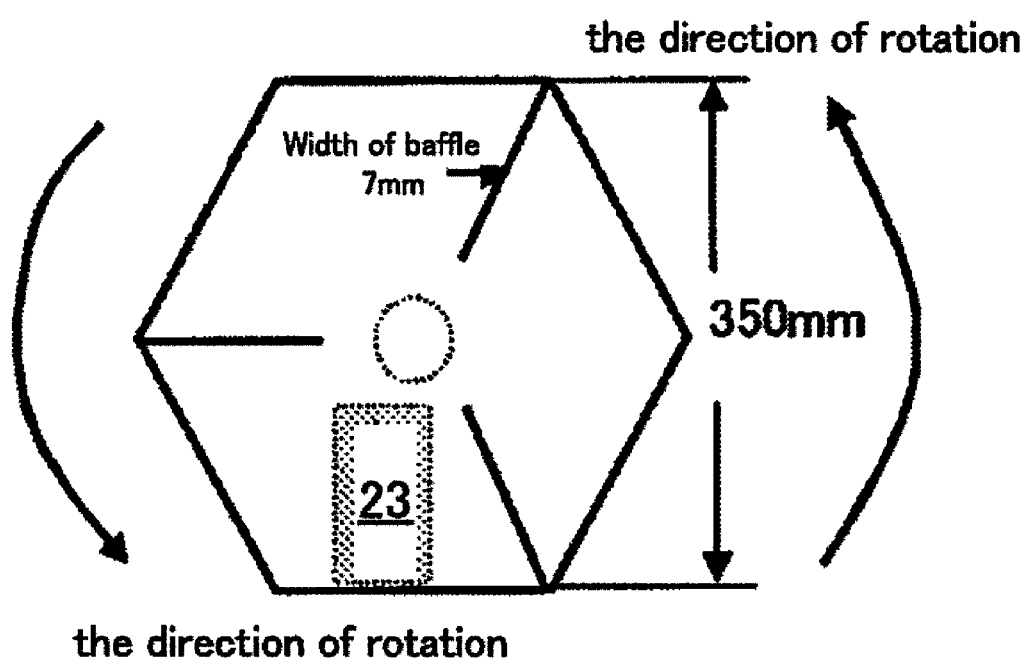
FIG. 3 is a side view illustrative of the hexagonal rotary testing machine.

FIG. 2 is a schematic view of the hexagonal rotary testing machine, and the FIG. 3 is a side view thereof. The hexagonal rotary testing machine includes a hexagonal tubular box having three baffles inside. The hexagonal tubular box is rotated by the drive motor 21 via the timing belt 22. The aforesaid package 23 was placed in the hexagonal tubular box equipped with baffles in the hexagonal rotary testing machine, and rotated at 30 rpm for 10 minutes. The testing was carried out 10 times to measure the rate of occurrence of pin holes. Set out below are the criteria for estimation.

A: The rate of occurrence of pinholes was 0 to 30%.
B: The rate of occurrence of pinholes was 31 to 60%.
C: The rate of occurrence of pinholes was 61 to 100%.

The resins used in the inventive and comparative examples are shown together with their physical properties in Table 1.

TABLE 1

| Abbreviations | Resins | Makers & Trade Names | Crystalline Melting Points (° C.) |
|---|---|---|---|
| Ny-A | Nylon 6-66 Copolymer<br>Nylon 6/Nylon 66 = 80/20 by mass | Toray Industries, Ltd.<br>Amilan CM6241F | 190 |
| Ny-B | Nylon 6-12 Copolymer<br>Nylon 6/Nylon 12 = 70/30 by mass | EMS-Chemie Japan Ltd.<br>Grilon CR-8 | 190 |
| Ny-C | Nylon 6-12 Copolymer<br>Nylon 6/Nylon 12 = 90/10 by mass | EMS-Chemie Japan Ltd<br>Grilon CR-9 | 200 |
| Ny-D | Polyamide/Polyether Block Copolymer | Arkema Co. Ltd<br>Pebax MV1074 | 158 |
| Ny-E | Nylon 6I-6T Copolymer (amorphous) | EMS-Chemie Japan Ltd<br>Grivory-G-21 | — |
| Ny-F | Nylon 6 | Toray Industries, Ltd.<br>Amilan CM1041LO | 225 |
| PET | Poly(ethylene terephthalate·isophthalate copolymer having a terephthelic/isophthalic ratio of 88/12 by mole | Bell Polyester Polyproducts, Ltd.<br>Bellpet IFG-8L | 223 |
| Md-VL-1 | Very-Low-Density Polyethylene denatured by unsaturated carboxylic acid | Mitsubishi Chemical Corporation<br>Modio 603 | 120 |
| Md-VL-2 | Very-Low-Density Polyethylene denatured by unsaturated carboxylic acid | Mitsui Chemicals Inc.<br>Admer SF-730 | 119 |
| Md-VL-3 | Ethylene-Ethyl Acrylate Copolymer | Nippon Unicar Co., Ltd.<br>DPDJ8182 | 90 |
| VLDPE | Ethylene-Octane Copolymer | Dow Chemical Co.<br>Attane #4404G | 124 |
| EVA | Ethylene-Vinyl Acetate Copolymer with a vinyl chloride content of 7.5% by mass | Nippon Unicar Co., Ltd<br>NUC8425 | 100 |
| PVDC | Vinylidene Chloride Base Copolymer | Kureha Co.<br>FB-2 | 145 |
| IO | Ionomer | Du Pont-Mitsui Polychemicals Co., Ltd.<br>Himilan 1601 | 97 |

| Abbreviations | Heat of Crystalline Fusion (J/g) | Density (g/cm3) | Remarks |
|---|---|---|---|
| Ny-A | 36 | 1.13 | The relative viscosity was 4.2 in a 96% sulfuric acid solution as measured according to JIS-6920-1 |
| Ny-B | 32 | 1.10 | The relative viscosity was 1.8 to 1.9 in a 0.5% m-cresol as measured according to ISO 307 |

TABLE 1-continued

| | | | |
|---|---|---|---|
| Ny-C | 38 | 1.10 | The relative viscosity was 1.7 to 1.8 in a 96% sulfuric acid solution as measured according to JIS-6920-1 |
| Ny-D | 30 | 1.07 | — |
| Ny-E | <5 | 1.18 | — |
| Ny-F | 57 | 1.13 | The relative viscosity was 4.4 in a 96% sulfuric acid solution as measured according to JIS-6920-1 |
| PET | — | 1.34 | The intrinsic viscosity was 0.8 |
| Md-VL-1 | — | 0.91 | The MFR was 2.0 g/10 min. |
| Md-VL-2 | — | 0.90 | The MFR was 2.7 g/10 min. |
| Md-VL-3 | — | 0.93 | The MFR was 1.5 g/10 min. |
| VLDPE | — | 0.904 | The MFR was 4.0 g/10 min. as measured according to ASTM D1238 |
| EVA | — | 0.93 | The MFR was 2.3 g/10 min. |
| PVDC | — | 1.71 | The MFR was 0.75 g/10 min. |
| IO | — | 0.94 | The MFR was 1.3 g/10 min. |

The compositions of the mixtures of polyamide resins used in the inventive and comparative examples are shown in Table 2.

TABLE 2

| Abbreviations | Compositions |
|---|---|
| Ny-1 | Ny-A 100% by mass |
| Ny-2 | Ny-A/Ny-B = 60/40 by mass |
| Ny-2a | Ny-A/Ny-B = 70/30 by mass |
| Ny-2b | Ny-A/Ny-C = 98/2 by mass |
| Ny-3 | Ny-A/Ny-D = 80/20 by mass |
| Ny-3a | Ny-A/Ny-D = 90/10 by mass |
| Ny-4 | Ny-A/Ny-E = 70/30 by mass |
| Ny-5 | Ny-A/Ny-F = 70/30 by mass |

Example 1

A parison having a laminated structure comprising PET (1.5)/Md-VL-1 (1.5)/Ny-2 (7.0)/Md-VL-2 (3.0)/Md-VL-1 (1.5)/VLDPE (15.5) (the respective thicknesses in m are bracketed) was co-extruded out of the extruder 1 in the production apparatus shown in FIG. 1 via the annular die 2. The parison was taken off while cooled down by water of 15 to 25° C. in the water bath 4. Then, the obtained parison was introduced into the hot water bath 6 of 89° C., and the heated parison was pulled up so that a tubular film was formed by fluid air admitted between a pair of pinch rollers 7 and 8, and that film was bi-axially oriented at a stretching ratio of 2.8 in the machine direction (MD) and 3.1 in the transverse direction (TD) while cooled down by the cold air ring 9 of 15 to 20° C. Then, the drawn tubular film was pulled down so that a tubular film was again formed by fluid air admitted between a pair of pinch rollers 10 and 11, and that tubular film was held in the heat-treating tube 12. And steam was blown out of the port 13 of the heat-treating tube 12 so that the tubular film was heat treated for relaxation of 10% in the machine direction (MD) and 15% in the transverse direction (TD). The heat-treated tubular film was taken up on the take-up roll 14 whereby a heat-shrinkable laminated film for deep drawing of the top film was obtained. That heat-shrinkable laminated film for deep drawing of the top film was deep drawn in a mold (of 100 mm in length, 110 mm in width and 30 mm in depth) in the deep drawing machine (R550 made by MULTIVAC Co., Ltd.) at a stretching temperature of 85° C., a degree of vacuum of 10 mbar and a stretching ratio of 2.1 for 2 seconds whereby the top film was obtained.

On the other hand, the same operations as mentioned above were carried out except that the laminated structure and the relaxation temperature and ratio of the bi-axially oriented tubular film were changed as shown in Table 3, whereby a heat-shrinkable laminated film for deep drawing of the bottom film was obtained. That heat-shrinkable laminated film for deep drawing was deep drawn in a mold (of 100 mm in length, 110 mm in breadth and 30 mm in depth) in the deep drawing machine (R550 made by MULTIVAC Co., Ltd.) at a stretching temperature of 85° C., a degree of vacuum of 10 mbar and a stretching ratio of 2.5 for 2 seconds whereby the bottom film was obtained.

Square-shaped natural cheese (of 90 mm in length, 100 mm in breadth and 60 mm in height and of a mass of about 540 g) was filled up in the deep drawn portion of the aforesaid bottom film. Thereafter, the aforesaid top film was located in opposition to the bottom film, and de-aeration sealing was carried out at 130° C. for 2 seconds. Then, the top and bottom films were heat shrunk at 85° C. for 1 second by means of a shrinker (boiling tank) whereby a package was obtained. The results are tabulated in Table 3.

Examples 2, 3, 4

The same operations as in Example 1 were carried out except that the laminated structure and the relaxation temperature and ratio of the bi-axially oriented tubular film were changed as shown in Table 3. The results are tabulated in Table 3.

TABLE 3

| | Example 1 | | Example 2 | | Example 3 | |
|---|---|---|---|---|---|---|
| Package Form: | Top Film | Bottom Film | Top Film | Bottom Film | Top Film | Bottom Film |
| Laminated Structure | | | | | | |
| 1$_{st}$ Layer (μm) | PET(1.5) | PET(3.0) | PET(1.5) | PET(3.0) | PET(1.5) | PET(3.0) |
| 2$_{nd}$ Layer (μm) | Md-VL-1(1.5) | Md-VL-1(2.0) | Md-VL-1(1.5) | Md-VL-1(2.0) | Md-VL-1(1.5) | Md-VL-1(2.0) |
| 3$_{rd}$ Layer (μm) | Ny-2(7.0) | Ny-2(18.0) | Ny-2a(7.0) | Ny-2a(18.0) | Ny-3(7.0) | Ny-3(18.0) |

TABLE 3-continued

| | | | | | | |
|---|---|---|---|---|---|---|
| $4_{th}$ Layer (μm) | Md-VL-2(3.0) | Md-VL-2(5.0) | Md-VL-2(3.0) | Md-VL-2(5.0) | Md-VL-2(3.0) | Md-VL-2(5.0) |
| $5_{th}$ Layer (μm) | Md-VL-1(1.5) | Md-VL-1(2.0) | Md-VL-1(1.5) | Md-VL-1(2.0) | Md-VL-1(1.5) | Md-VL-1(2.0) |
| $6_{th}$ Layer (μm) | VLDPE(15.5) | VLDPE(40.0) | VLDPE(15.5) | VLDPE(40.0) | VLDPE(15.5) | VLDPE(40.0) |
| Total Thickness (μm) | 30 | 70 | 30 | 70 | 30 | 70 |
| MD/TD Stretching Ratio | 2.9/3.1 | 2.9/3.1 | 2.9/3.1 | 2.9/3.1 | 2.9/3.1 | 2.9/3.1 |
| Relaxation Temp. (° C.) | 65 | 85 | 65 | 85 | 65 | 85 |
| MD/TD Relaxation Ratio (%) | 10/15 | 25/25 | 10/15 | 25/25 | 10/15 | 25/25 |
| Tensile Modulus (MPa) | 305/283 | 262/252 | 295/270 | 250/242 | 330/326 | 262/270 |
| MD/TD Shrinkage (%) | 32/32 | 18/22 | 30/30 | 16/20 | 31/31 | 16/21 |
| Puncture Strength (N) | 12/10 | 19/13 | 13/11 | 19/14 | 12/9 | 12/9 |
| Carbon Dioxide Transmission Rate *1) | 2057 | 1072 | 1710 | 950 | 1680 | 1160 |
| OxygenTransmission Rate *1) | 245 | 150 | 240 | 155 | 240 | 155 |
| Carbon Dioxide Selection Ratio | 8.4 | 7.2 | 7.1 | 6.1 | 7 | 7.5 |
| Water Vapor Transmission Rate *2) | 24 | 12 | 23 | 11 | 22 | 12 |
| Haze Value | 3 | 11 | 3 | 12 | 4 | 11 |
| Estimation of Gas Expansion | A | A | A | A | A | A |
| Estimation of Wrinkling | A | A | A | A | A | A |
| Abuse Strength | A | A | A | A | A | A |

| | Example 4 | | |
|---|---|---|---|
| Package Form: | Top Film | Bottom Film | Remarks |
| Laminated Structure | | | |
| $1_{st}$ Layer (μm) | PET(1.5) | PET(3.0) | Thickness |
| $2_{nd}$ Layer (μm) | Md-VL-1(1.5) | Md-VL-1(2.0) | Composition |
| $3_{rd}$ Layer (μm) | Ny-3a(7.0) | Ny-3a(18.0) | |
| $4_{th}$ Layer (μm) | Md-VL-2(3.0) | Md-VL-2(5.0) | |
| $5_{th}$ Layer (μm) | Md-VL-1(1.5) | Md-VL-1(2.0) | |
| $6_{th}$ Layer (μm) | VLDPE(15.5) | VLDPE40.0) | |
| Total Thickness (μm) | 30 | 70 | |
| MD/TD Stretching Ratio | 2.9/3.1 | 2.9/3.1 | Film-formation |
| Relaxation Temp. (° C.) | 65 | 85 | Conditions |
| MD/TD Relaxation Ratio (%) | 10/15 | 25/25 | |
| Tensile Modulus (MPa) | 298/293 | 235/243 | Film Properties |
| MD/TD Shrinkage (%) | 29/30 | 15/19 | |
| Puncture Strength (N) | 12/8 | 11/8 | |
| Carbon Dioxide Transmission Rate *1) | 1510 | 1040 | |
| Oxygen Transmission Rate *1) | 232 | 165 | |
| Carbon Dioxide Selection Ratio | 6.5 | 6.3 | |
| Water Vapor Transmission Rate *2) | 20 | 11 | |
| Haze Value | 4 | 11 | |
| Estimation of Gas Expansion | A | A | Estimation of |
| Estimation of Wrinkling | A | A | the Packages |
| Abuse Strength | A | A | |

*1) indicates that the unit is in ml/m² · day · atm.
*2) indicates that the unit is in g/m² · day.

The heat-shrinkable laminated films for deep drawing of Examples 1 to 4 had an increased carbon dioxide transmission rate ($CO_2TR$) and an enhanced ratio ($CO_2TR/O_2TR$) of carbon dioxide transmission rate-to-oxygen transmission rate ($O_2TR$). Therefore, the package of cheese packed up in the top and bottom films obtained by deep drawing of the heat-shrinkable laminated films for deep drawing of Examples 1 to 4 was prevented from expansion by carbon dioxide and kept against wrinkling at the surface. In addition, the heat-shrinkable laminated films for deep drawing according to Examples 1 to 4 were less susceptible of pinholes.

Comparative Examples 1, 2, 3

The same operations as in Example 1 were carried out except that the laminated structure and the relaxation temperature and ratio of the bi-axially oriented tubular film were changed as shown in Table 4. The results are tabulated in Table 4.

TABLE 4

| | Comparative Example 1 | | Comparative Example 2 | | Comparative Example 3 | | |
|---|---|---|---|---|---|---|---|
| Package Form: | Top Film | Bottom Film | Top Film | Bottom Film | Top Film | Bottom Film | Remarks |
| Laminated Structure | | | | | | | |
| $1_{st}$ Layer (μm) | PET(1.5) | PET(3.0) | PET(2.0) | PET(3.0) | PET(2.0) | PET(3.0) | Thickness |
| $2_{nd}$ Layer (μm) | Md-VL-1(1.5) | Md-VL-1(2.0) | Md-VL-1(2.0) | Md-VL-1(3.0) | Md-VL-1(2.0) | Md-VL-1(3.0) | Composition |
| $3_{rd}$ Layer (μm) | Ny-1(7.0) | Ny-1(18.0) | Ny-1(10.0) | Ny-1(23.0) | Ny-2b(10.0) | Nv-2b(23.0) | |
| $4_{th}$ Layer (μm) | Md-VL-2(3.0) | Md-VL-2(4.0) | Md-VL-2(3.0) | Md-VL-2(4.0) | Md-VL-2(3.0) | Md-VL-2(4.0) | |
| $5_{th}$ Layer (μm) | Md-VL-1(1.5) | Md-VL-1(2.0) | Md-VL-1(1.5) | Md-VL-1(3.0) | Md-VL-1(1.5) | Md-VL-1(3.0) | |

TABLE 4-continued

|  | Comparative Example 1 | | Comparative Example 2 | | Comparative Example 3 | | |
|---|---|---|---|---|---|---|---|
| Package Form: | Top Film | Bottom Film | Top Film | Bottom Film | Top Film | Bottom Film | Remarks |
| $6_{th}$ Layer (μm) | VLDPE(15.5) | VLDPE(41.0) | VLDPE(21.5) | VLDPE(54.0) | VLDPE(21.5) | VLDPE(54.0) |  |
| Total Thickness (μm) | 30 | 70 | 40 | 90 | 40 | 90 |  |
| MD/TD Stretching Ratio | 2.9/3.1 | 2.9/3.1 | 2.9/3.1 | 2.9/3.1 | 2.9/3.1 | 2.9/3.1 | Film-formation |
| Relaxation Temp. (° C.) | 65 | 85 | 65 | 87 | 65 | 87 | Conditions |
| MD/TD Relaxation Ratio (%) | 10/15 | 25/25 | 10/15 | 25/25 | 10/15 | 25/25 |  |
| Tensile Modulus (MPa) | 330/326 | 262/271 | 325/320 | 240/255 | 325/232 | 250/248 | Film Properties |
| MD/TD Shrinkage (%) | 28/27 | 16/20 | 26/26 | 6/7 | 28/28 | 6/8 |  |
| Puncture Strength (N) | 11/9 | 17/18 | 16/15 | 28/21 | 14/14 | 26/20 |  |
| Carbon Dioxide Transmission Rate *1) | 980 | 700 | 850 | 655 | 850 | 680 |  |
| OxygenTransmission Rate *1) | 280 | 200 | 250 | 183 | 220 | 185 |  |
| Carbon Dioxide Selection Ratio | 3.5 | 3.5 | 3.4 | 3.4 | 3.8 | 3.7 |  |
| Water Vapor Transmission Rate *2) | 23 | 11 | 18 | 9 | 18 | 9 |  |
| Haze Value | 4 | 13 | 4 | 13 | 4 | 14 |  |
| Estimation of Gas Expansion | B | B | C | C | C | C | Estimation of |
| Estimation of Wrinkling | B | B | C | C | C | C | the Packages |
| Abuse Strength | B | B | C | C | C | C |  |

*1) indicates that the unit is in ml/m² · day · atm.
*2) indicates that the unit is in g/m² · day.

The third layer of the heat-shrinkable laminated film for deep drawing according to Comparative Example 1 consists only of the nylon 6-66 copolymer that is an aliphatic polyamide resin. The carbon dioxide transmission rate and carbon dioxide selection ratio of that heat-shrinkable laminated film for deep drawing were much lower than those of the heat-shrinkable laminated film for deep drawing according to Example 1. Accordingly, a package having cheese packed up in the top and bottom films obtained by deep drawing of that heat-shrinkable laminated film for deep drawing could not be prevented from swelling due to carbon dioxide, resulting in wrinkles at the surface. In addition, that heat-shrinkable laminated film for deep drawing had pinholes.

The third layer of the heat-shrinkable laminated film for deep drawing according to Comparative Example 2, too, consists only of the nylon 6-66 copolymer that is an aliphatic polyamide resin. The heat-shrinkable laminated film for deep drawing according to Comparative Example 3 consists of a polyamide resin mixture containing greater than 95% by mass of an aliphatic polyamide resin. The carbon dioxide transmission rates and carbon dioxide selection ratios of the heat-shrinkable laminated films for deep drawing according to Comparative Examples 2 and 3 remained low. Accordingly, a package having cheese packed up in the top and bottom films obtained by deep drawing of the heat-shrinkable laminated film for deep drawing according to Comparative Example 2, and 3 could not be prevented from swelling due to carbon dioxide. In addition, the heat-shrinkable laminated film for deep drawing according to Comparative Example 2, and 3 had pinholes.

Comparative Example 4

Co-extrusion was carried out with a parison having the same laminated structure as in Example 1 except that the polyamide resin mixture Ny-2c containing less than 60% by mass of aliphatic polyamide resins was used as the polyamide resin mixture forming the third layer, and it was attempted to make drawn films from the heat-shrinkable laminated films for deep drawing of the top and bottom films. However, any drawn film could not be obtained from those laminated films.

Comparative Examples 5, 6

The same operations as in Example 1 were carried out except that the laminated structure and the relaxation temperature and ratio of the bi-axially oriented tubular film were changed as shown in FIG. 5. The results are tabulated in Table 5.

Comparative Example 7

A parison having a laminated structure comprising EVA (15.0)/Md-VL-3 (1.0)/PVDC (2.5)/Md-VL-3 (1.0)/10 (30.5) (the respective layer thicknesses are bracketed in μm) was co-extruded out of the extruder 1 in the production apparatus shown in FIG. 1 via the annular die 2. The parison was taken off by the pinch roller 5 while cooled down by water of 20 to 25° C. in the water bath 4. Then, the obtained tubular film was introduced in the hot water bath 6 of 90 to 95° C., and the heated parison was pulled up so that a tubular film was formed by fluid air admitted between a pair of pinch rollers 7 and 8. While cooled down by the cold air ring 9 of 15 to 20° C., the tubular film was then bi-axially oriented at a stretching ratio of 2.8 in the machine direction (MD) and 2.8 in the transverse direction (TD). Then, the tubular film was heated by means of an infrared heater so that it was relaxed 5 to 7% in the machine direction (MD) and 3 to 5% in the transverse direction (TD) into a laminated film. The obtained laminated film (having a bent width of 250 mm) was sealed at the bottom by a bag making machine (made by Kureha Co., Ltd.) to obtain a bag film. Square-shaped natural cheese was packed up in that bag film and measurements were made of gas expansion, wrinkling, and abuse strength. The results are tabulated in Table 5.

TABLE 5

| | Comparative Example 5 | | Comparative Example 6 | | Comparative Example 7 | |
|---|---|---|---|---|---|---|
| Package Form: | Top Film | Bottom Film | Top Film | Bottom Film | Bag Film | Remarks |
| Laminated Structure | | | | | | |
| $1_{st}$ Layer (μm) | PET(2.0) | PET(3.0) | PET(2.0) | PET(3.0) | EVA(15.0) | Thickness |
| $2_{nd}$ Layer (μm) | Md-VL-1(2.0) | Md-VL-1(3.0) | Md-VL-1(2.0) | Md-VL-1(3.0) | Md-VL-3(1.0) | Composition |
| $3_{rd}$ Layer (μm) | Ny-4(10.0) | Ny-4(23.0) | Ny-5(10.0) | Ny-5(23.0) | PVDC(4.5) | |
| $4_{th}$ Layer (μm) | Md-VL-2(3.0) | Md-VL-2(4.0) | Md-VL-2(3.0) | Md-VL-2(4.0) | Md-VL-3(1.0) | |
| $5_{th}$ Layer (μm) | Md-VL-1(1.5) | Md-VL-1(3.0) | Md-VL-1(1.5) | Md-VL-1(3.0) | IO(28.6) | |
| $6_{th}$ Layer (μm) | VLDPE(21.5) | VLDPE(54.0) | VLDPE(21.5) | VLDPE(54.0) | — | |
| Total Thickness (μm) | 40 | 90 | 40 | 90 | 50 | |
| MD/TD Stretching Ratio | 2.9/3.1 | 2.9/3.1 | 2.9/3.1 | 2.9/3.1 | 2.5/2.5 | Film-formation |
| Relaxation Temp. (° C.) | 65 | 87 | 65 | 87 | — | Conditions |
| MD/TD Relaxation Ratio (%) | 10/15 | 25/25 | 10/15 | 25/25 | 5.0/2.0 | |
| Tensile Modulus (MPa) | 340/330 | 370/345 | 360/370 | 390/400 | 147/245 | Film Properties |
| MD/TD Shrinkage (%) | 31/30 | 9/10 | 24/26 | 4/4 | 25/24 | |
| Puncture Strength (N) | 16/15 | 28/23 | 16/15 | 28/25 | 13/14 | |
| Carbon Dioxide Transmission Rate *1) | 744 | 567 | 638 | 540 | 537 | |
| OxygenTransmission Rate *1) | 240 | 183 | 220 | 185 | 125 | |
| Carbon Dioxide Selection Ratio | 3.1 | 3.1 | 2.9 | 2.9 | 4.3 | |
| Water Vapor Transmission Rate *2) | 18 | 9 | 18 | 9 | 4.5 | |
| Haze Value | 7 | 14 | 7 | 16 | 4.7 | |
| Estimation of Gas Expansion | B | C | — | — | C | Estimation of |
| Estimation of Wrinkling | C | C | — | — | C | the Packages |
| Abuse Strength | C | C | — | — | C | |

*1) indicates that the unit is in ml/m² · day · atm.
*2) indicates that the unit is in g/m² · day.

The third layer of the heat-shrinkable laminated film for deep drawing according to Comparative Example 5 consists of a polyamide resin mixture containing a non-crystalline nylon 6I-6T having a heat of crystalline fusion of less than 5 J/g. The carbon dioxide transmission rate and carbon dioxide selection ratio of the heat-shrinkable laminated film for deep drawing according to Comparative Example 5 remained low. Accordingly, a package having cheese packed up in the top and bottom films obtained by deep drawing of the heat-shrinkable laminated film for deep drawing according to Comparative Example 5 could not be prevented from swelling due to carbon dioxide. In addition, the heat-shrinkable laminated film for deep drawing according to Comparative Example 5 had pinholes.

The third layer of the heat-shrinkable laminated film for deep drawing according to Comparative Example 6 consists of a polyamide resin mixture containing nylon 6 having a heat of crystalline fusion of greater than 40 J/g. The carbon dioxide transmission rate and carbon dioxide selection ratio of the heat-shrinkable laminated film for deep drawing according to Comparative Example 6 remained considerably low, so that it could not be measured for gas expansion and wrinkling, and for abuse strength, either.

The carbon dioxide transmission rate and carbon dioxide selection ratio of the bag film according to Comparative Example 7 remained low. Accordingly, a package having cheese wrapped up in that bag film could not be prevented from swelling due to carbon dioxide, resulting in winkles on the surface. In addition, that bag film had pinholes.

Examples 5, 6, 7, 8

The same operations as in Example 1 were carried out except that the laminated structure, and the relaxation temperature and ratio of the bi-axially oriented tubular film were changed as set out in Table 6. The results are tabulated in Table 6.

TABLE 6

| | Example 5 | | Example 6 | | Example 7 | |
|---|---|---|---|---|---|---|
| Package Form: | Top Film | Bottom Film | Top Film | Bottom Film | Top Film | Bottom Film |
| Laminated Structure | | | | | | |
| $1_{st}$ Layer (μm) | PET(2.0) | PET(3.0) | PET(3.0) | PET(3.0) | PET(1.5) | PET(2.0) |
| $2_{nd}$ Layer (μm) | Md-VL-1(2.0) | Md-VL-1(2.0) | Md-VL-1(2.0) | Md-VL-1(2.0) | Md-VL-1(1.5) | Md-VL-1(2.0) |
| $3_{rd}$ Layer (μm) | Ny-3(10.0) | Ny-3(18.0) | Ny-3(18.0) | Ny-3(18.0) | Ny-3(7.0) | Ny-3(23.0) |
| $4_{th}$ Layer (μm) | Md-VL-2(3.0) | Md-VL-2(5.0) | Md-VL-2(5.0) | Md-VL-2(5.0) | Md-VL-2(3.0) | Md-VL-2(5.0) |
| $5_{th}$ Layer (μm) | Md-VL-1(1.5) | Md-VL-1(1.5) | Md-VL-1(1.5) | Md-VL-1(1.5) | Md-VL-1(1.5) | Md-VL-1(1.5) |
| $6_{th}$ Layer (μm) | VLDPE(21.5) | VLDPE(40.5) | VLDPE(40.5) | VLDPE(40.5) | VLDPE(15.5) | VLDPE(16.5) |
| Total Thickness (μm) | 40 | 70 | 30 | 70 | 30 | 50 |
| MD/TD Stretching Ratio | 2.9/3.1 | 2.9/3.1 | 2.9/3.1 | 2.9/3.1 | 2.9/3.1 | 2.9/3.1 |
| Relaxation Temp. (° C.) | 65 | 85 | 85 | 85 | 65 | 85 |
| MD/TD Relaxation Ratio (%) | 10/15 | 25/25 | 25/25 | 25/25 | 10/15 | 25/25 |
| Tensile Modulus (MPa) | 258/262 | 265/272 | 401/392 | 261/268 | 238/242 | 382/362 |
| MD/TD Shrinkage (%) | 32/29 | 16/21 | 16/21 | 16/21 | 31/31 | 15/20 |

TABLE 6-continued

| | | | | | | |
|---|---|---|---|---|---|---|
| Puncture Strength (N) | 10/13 | 13/9 | 12/8 | 11/10 | 13/9 | 12/10 |
| Carbon Dioxide Transmission Rate *1) | 1240 | 1160 | 1160 | 1160 | 1680 | 1300 |
| OxygenTransmission Rate *1) | 170 | 155 | 155 | 155 | 240 | 205 |
| Carbon Dioxide Selection Ratio | 7.3 | 7.5 | 7.5 | 7.5 | 7 | 6.3 |
| Water Vapor Transmission Rate *2) | 17 | 12 | 12 | 12 | 22 | 9 |
| Haze Value | 5 | 11 | 4 | 10 | 4 | 6 |
| Estimation of Gas Expansion | A | A | A | A | A | A |
| Estimation of Wrinkling | A | A | A | A | A | A |
| Abuse Strength | A | A | A | A | A | A |

| | Example 8 | | |
|---|---|---|---|
| Package Form: | Top Film | Bottom Film | Remarks |
| Laminated Structure | | | |
| $1_{st}$ Layer (μm) | PET(2.0) | PET(3.0) | Thickness |
| $2_{nd}$ Layer (μm) | Md-VL-1(2.0) | Md-VL-1(2.0) | Composition |
| $3_{rd}$ Layer (μm) | Ny-3(23.0) | Ny-3(30.0) | |
| $4_{th}$ Layer (μm) | Md-VL-2(5.0) | Md-VL-2(5.0) | |
| $5_{th}$ Layer (μm) | Md-VL-1(1.5) | Md-VL-1(1.5) | |
| $6_{th}$ Layer (μm) | VLDPE(16.5) | VLDPE(58.5) | |
| Total Thickness (μm) | 50 | 100 | |
| MD/TD Stretching Ratio | 2.9/3.1 | 2.9/3.1 | Film-formation |
| Relaxation Temp. (° C.) | 65 | 85 | Conditions |
| MD/TD Relaxation Ratio (%) | 10/15 | 25/25 | |
| Tensile Modulus (MPa) | 378/358 | 280/278 | Film Properties |
| MD/TD Shrinkage (%) | 30/29 | 15/19 | |
| Puncture Strength (N) | 14/10 | 16/14 | |
| Carbon Dioxide Transmission Rate *1) | 940 | 812 | |
| OxygenTransmission Rate *1) | 156 | 117 | |
| Carbon Dioxide Selection Ratio | 6 | 6.9 | |
| Water Vapor Transmission Rate *2) | 14 | 5 | |
| Haze Value | 6 | 15 | |
| Estimation of Gas Expansion | A | A | Estimation of |
| Estimation of Wrinkling | A | A | the Packages |
| Abuse Strength | A | A | |

*1) indicates that the unit is in ml/m² · day · atm.
*2) indicates that the unit is in g/m² · day.

The heat-shrinkable laminated films for deep drawing according to Examples 5 to 8, too, had an increased carbon dioxide transmission rate ($CO_2TR$), and an enhanced ratio ($CO_2TR/O_2TR$) of carbon dioxide transmission rate-to-oxygen transmission rate ($O_2TR$). Accordingly, a package of cheese packed up in the top and bottom films obtained by deep drawing of the heat-shrinkable laminated film for deep drawing according to Example 5, 6, 7, and 8 could be prevented from swelling due to carbon dioxide, and free of wrinkles at the surface. In addition, the heat-shrinkable laminated film for deep drawing according to Example 5, 6, 7, and 8 was less susceptible of pinholes.

INDUSTRIAL APPLICABILITY

The inventive heat-shrinkable laminated film for deep drawing may find use in the packing material field inclusive of (1) packing of, with or without carbon dioxide substitution, foodstuffs such as cheese, kimuchi, and garlic that emit out carbon dioxide, (2) chilled packing and pillow packing (flow packing) of fresh meats such as beef and pork, (3) packing of heavily smoked foodstuffs represented by processed hard bacon, (4) ceramic jar packing such as terrines, (5) packing of spiny foodstuffs such as meats with bones, shrimps or lobsters and fishes, and (6) freeze packing of raw poultry meat and fishes.

What we claim is:

1. A heat-shrinkable laminated film for deep drawing, wherein a polyamide resin composition layer (a) containing a polyamide resin mixture comprising 60 to 95% by mass of an aliphatic polyamide resin (A) and 5 to 40% by mass of a polyamide base resin (B) having a heat of crystalline fusion of 5 to 35 J/g and a density of 0.95 to 1.10 g/cm3 is laminated onto a heat-sealing resin layer (c) containing a polyolefin resin via an adhesive resin layer (b), and the heat of crystalline fusion ΔHA of the aliphatic
polyamide (A) and the heat of crystalline fusion ΔHB of the polyamide base resin (B) satisfy the following condition (1):

$$\Delta HA > \Delta HB \qquad (1),$$

wherein said aliphatic polyamide resin (A) consists of only a nylon 6-66 or only a nylon 6-12, and
wherein said polyamide base resin (B) is a polyamide/polyether block copolymer.

2. The heat-shrinkable laminated film for deep drawing according to claim 1, which has a heat shrinkage of 3 to 35% at 90° C. in machine and transverse directions, an oxygen transmission rate of up to 300 ml/m2·day·am at 23° C. and an 80% relative humidity, a carbon dioxide transmission of at least 500 ml/m2·day·atm at 23° C. and an 80% relative humidity, and a carbon dioxide transmission rate-to-oxygen transmission rate of at least 6.

3. The heat-shrinkable laminated film for deep drawing according to claim 2, which has a carbon dioxide transmission rate of at least 800 ml/m2·day·atm at 23° C. and an 80% relative humidity and a carbon dioxide transmission rate-to-oxygen transmission rate of at least 7.

4. The heat-shrinkable laminated film for deep drawing according to claim 3, wherein said polyamide resin composition layer (a) has a thickness of 5 to 50 μm.

5. The heat-shrinkable laminated film for deep drawing according to claim 4, wherein a polyester base resin layer (d) is laminated onto said polyamide resin composition layer (a).

6. A package, wherein a matter to be packed is packed up in top and bottom films obtained by deep drawing of the heat-shrinkable laminated film for deep drawing according to claim 5.

7. The package according to claim 6, wherein the matter to be packed is cheese.

* * * * *